(12) United States Patent
Huang et al.

(10) Patent No.: US 11,456,091 B2
(45) Date of Patent: Sep. 27, 2022

(54) MULTI-CORE CABLE

(71) Applicant: Hitachi Metals, Ltd., Tokyo (JP)

(72) Inventors: Detian Huang, Tokyo (JP); Yoshinori Tsukamoto, Tokyo (JP); Masashi Moriyama, Tokyo (JP); Takahiro Sugiyama, Tokyo (JP); Hiroshi Ishikawa, Tokyo (JP); Hideki Nonen, Tokyo (JP)

(73) Assignee: HITACHI METALS, LTD., Tokyo (JP)

( * ) Notice: Subject to any disclaimer, the term of this patent is extended or adjusted under 35 U.S.C. 154(b) by 0 days.

(21) Appl. No.: 17/390,301

(22) Filed: Jul. 30, 2021

(65) Prior Publication Data

US 2022/0068521 A1 Mar. 3, 2022

(30) Foreign Application Priority Data

Aug. 25, 2020 (JP) .............................. JP2020-142077

(51) Int. Cl.
| | | |
|---|---|---|
| *H01B 11/04* | (2006.01) | |
| *H01B 7/02* | (2006.01) | |
| *H01B 7/32* | (2006.01) | |
| *G08B 17/02* | (2006.01) | |
| *H01B 7/29* | (2006.01) | |
| *H01B 7/18* | (2006.01) | |

(52) U.S. Cl.
CPC ............. *H01B 7/324* (2013.01); *G08B 17/02* (2013.01); *H01B 7/1875* (2013.01); *H01B 7/292* (2013.01)

(58) Field of Classification Search
CPC ......... H01B 5/08; H01B 7/0208; H01B 11/04
See application file for complete search history.

(56) References Cited

U.S. PATENT DOCUMENTS 3,392,017 A * 7/1968 Quaas .................. B23K 35/302
420/570
6,359,230 B1 3/2002 Hildreth
(Continued)

FOREIGN PATENT DOCUMENTS

JP S58-086695 A 5/1983

OTHER PUBLICATIONS

United States Office Action dated May 26, 2022 in U.S. Appl. No. 17/381,934.

*Primary Examiner* — Chau N Nguyen
(74) *Attorney, Agent, or Firm* — McGinn IP Law Group, PLLC

(57) ABSTRACT

A multi-core cable includes a heat detection line including a twisted pair wire composed of a pair of heat detecting wires being twisted together, each of which includes a first conductor and a first insulator covering a periphery of the first conductor, a plurality of electric wires spirally twisted around the heat detection line, each of which includes a second conductor and a second insulator covering a periphery of the second conductor, and a sheath covering the heat detection line and the plurality of electric wires together. A melting point of the first insulator is lower than a melting point of the second insulator. The second conductor has a shape in a cross-section perpendicular to a cable longitudinal direction in which a width along a circumferential direction is gradually increased from a radially inward portion to a radially outward portion.

20 Claims, 4 Drawing Sheets

(56) References Cited

U.S. PATENT DOCUMENTS

| | | | | |
|---|---|---|---|---|
| 8,471,149 B2 * | 6/2013 | Huynh | .................. | H01B 7/048 |
| | | | | 174/105 R |
| 8,937,253 B2 * | 1/2015 | Watanabe | ....... | A61M 25/09033 |
| | | | | 174/107 |
| 2006/0054334 A1 * | 3/2006 | Vaupotic | ............ | H01B 11/1008 |
| | | | | 174/36 |
| 2016/0005508 A1 * | 1/2016 | Maclean | ................. | H01B 3/40 |
| | | | | 174/99 R |
| 2019/0228874 A1 * | 7/2019 | Kohori | ................ | H01B 7/0216 |

* cited by examiner

MULTI-CORE CABLE

CROSS-REFERENCE TO RELATED APPLICATION

The present application is based on Japanese patent application No. 2020-142077 filed on Aug. 25, 2020, the entire contents of which are incorporated herein by reference.

BACKGROUND OF THE INVENTION

1. Field of the Invention

The present invention relates to a multi-core cable.

2. Description of the Related Art

Conventionally, fire detection wires have been used to detect fires (see e.g., JPS58-86695A). The fire detection wire is configured to have a twisted pair wire including a pair of fire detection electric wires being twisted together, each of which includes a conductor made of a steel wire such as a piano wire and a low melting point insulator covering a periphery of the conductor, and a jacket covering the twisted pair wire.

Further, conventionally, the fire detection wire is arranged along a cable. For example, in a multi-core cable used for contactless power supplies, a fire detection wire is provided between the multi-core cable and a housing for accommodating the multi-core cable.

[Patent Document 1] JPS58-86695A

SUMMARY OF THE INVENTION

In the multi-core cable to be laid in the housing, for example, when used for contactless power supplies, the electric wires (power lines) provided within the multi-core cable receive a large current flow. Therefore, there is a demand to suppress the rise in temperature in the multi-core cable, which may result in a fire when excessive current flows through the electric wires for any reason.

Therefore, the object of the present invention is to provide a multi-core cable that can accurately detect the temperature rise in the multi-core cable, which is laid in the housing.

For the purpose of solving the aforementioned problem, one aspect of the present invention provides a multi-core cable, comprising:

a heat detection line comprising a twisted pair wire comprising a pair of heat detecting wires being twisted together, each heat detecting wire comprising a first conductor and a first insulator covering a periphery of the first conductor;

a plurality of electric wires spirally twisted around the heat detection line, each electric wire comprising a second conductor and a second insulator covering a periphery of the second conductor; and a sheath covering the heat detection line and the plurality of electric wires together, wherein a melting point of the first insulator is lower than a melting point of the second insulator, wherein the second conductor has a shape of a cross-section perpendicular to a cable longitudinal direction in which a width along a circumferential direction is gradually increased from a radially inward portion to a radially outward portion.

Points of the Invention

According to the present invention, it is possible to provide a multi-core cable that can accurately detect the temperature rise in the multi-core cable, which is laid in the housing.

BRIEF DESCRIPTION OF THE DRAWINGS

Next, preferred embodiment according to the present invention will be described with reference to appended drawings, wherein.

DETAILED DESCRIPTION OF THE PREFERRED EMBODIMENTS

Embodiment

An embodiment of the present invention will be described below in conjunction with the accompanying drawings.

Figure 1A:
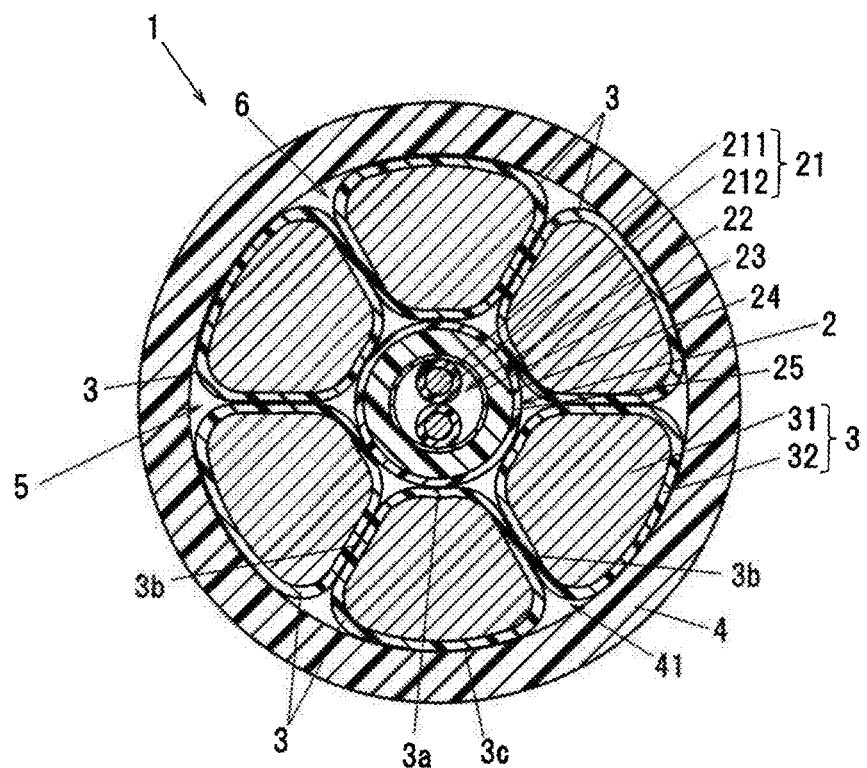
FIG. 1A is a cross-sectional view showing a cross-section perpendicular to a cable longitudinal direction of a multi-core cable in an embodiment.
Figure 1B:
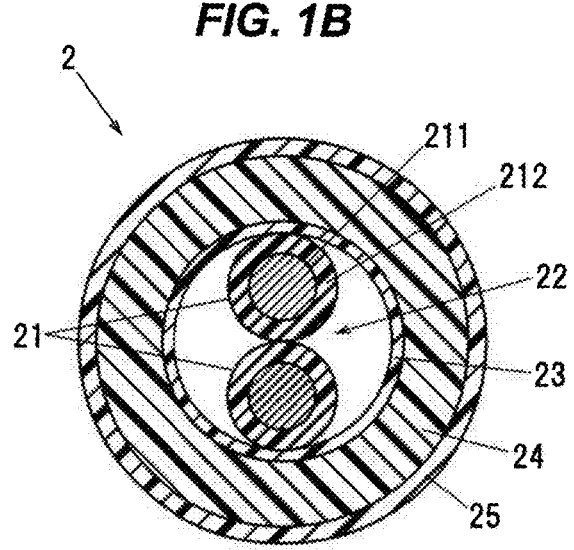
FIG. 1B is a cross-sectional view showing a cross-section perpendicular to the cable longitudinal direction of a heat detection line.
Figure 1C:
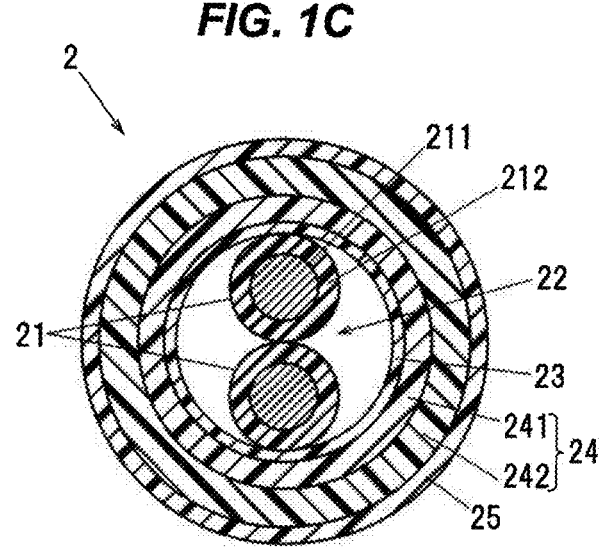
FIG. 1C is a cross-sectional view showing a cross-section perpendicular to the cable longitudinal direction of another heat detection line.
Figure 2:
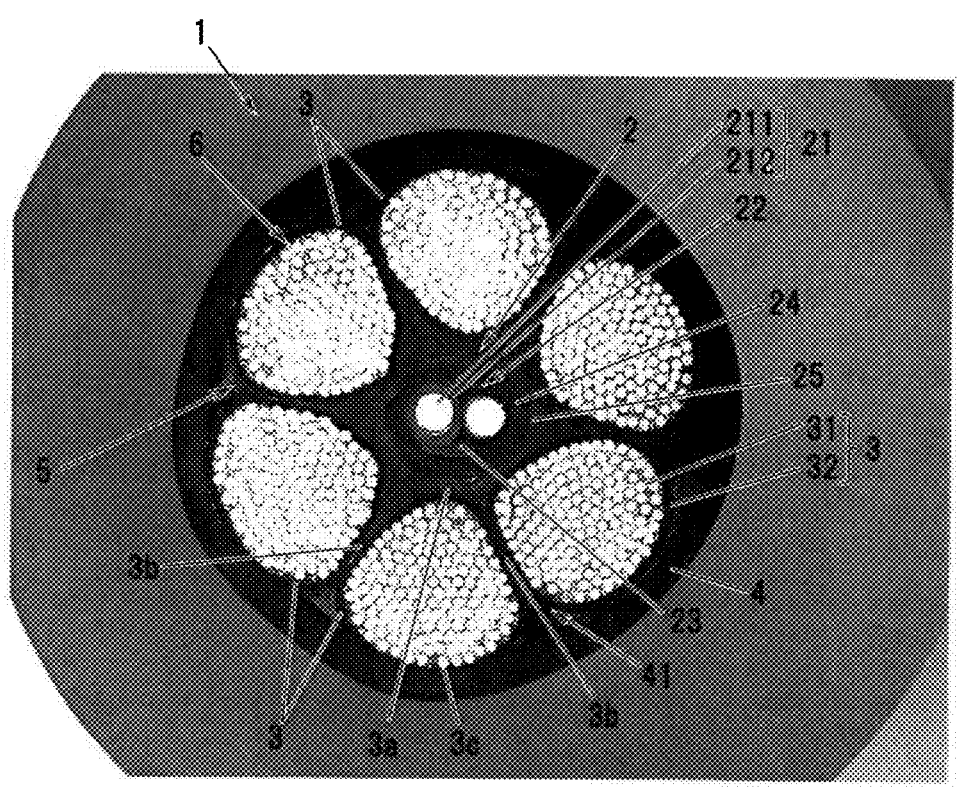
FIG. 2 is a photographic image showing a cross-section perpendicular to the cable longitudinal direction of the multi-core cable.
Figure 3:
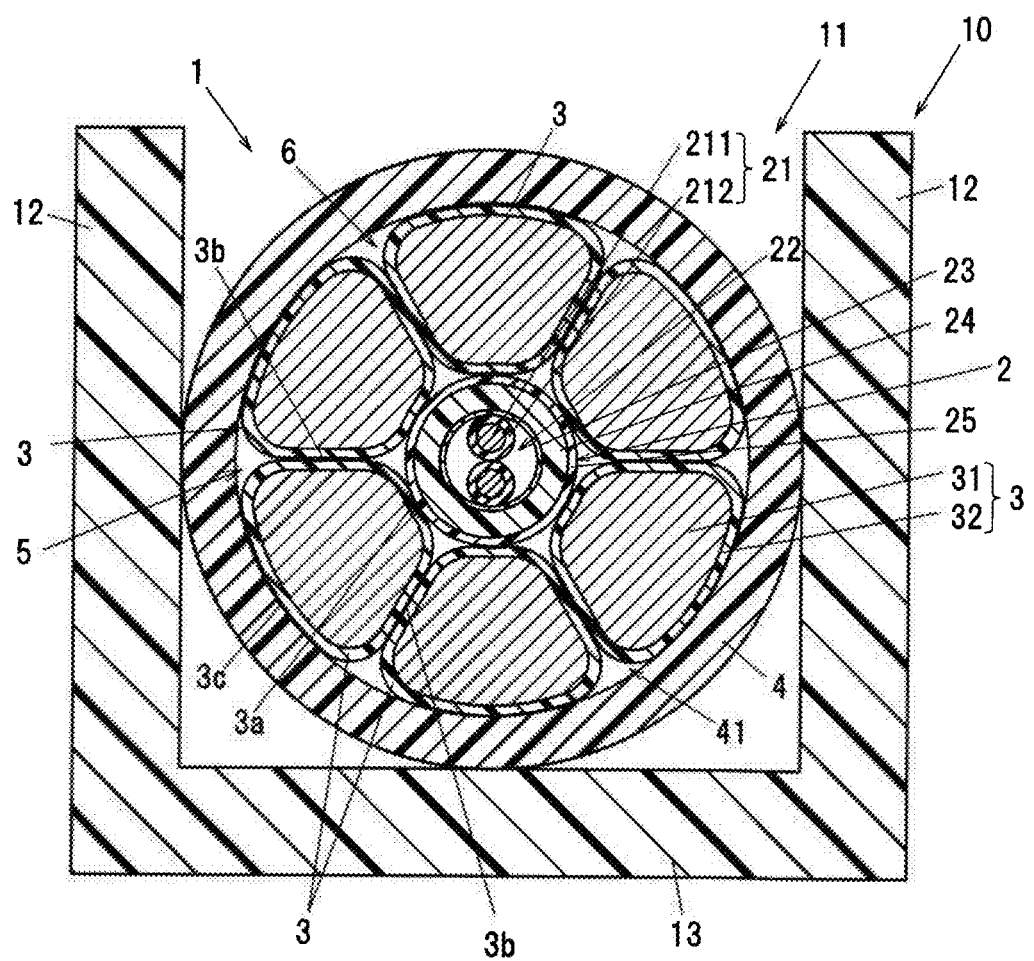
FIG. 3 is a cross-sectional view of the multi-core cable accommodated in a groove of a housing.

FIG. 1A is a cross-sectional view showing a cross-section perpendicular to a cable longitudinal direction of a multi-core cable in an embodiment according to the present invention, FIG. 1B is a cross-sectional view showing a cross-section perpendicular to the cable longitudinal direction of a heat detection line, and FIG. 1C is a cross-sectional view showing a cross-section perpendicular to the cable longitudinal direction of another heat detection line. FIG. 2 is a photographic image showing a cross-section perpendicular to the cable longitudinal direction of the multi-core cable. FIG. 3 is a cross-sectional view of the multi-core cable accommodated in a groove of a housing. In the photographic image shown in FIG. 2, for easily observing the state of the cross section of the multi-core cable, epoxy resin was packed around the multi-core cable and around the heat detection line. After polishing a cut end face, the photographic image of the cut end face was taken.

As shown in FIGS. 1A, 1B, 1C, 2 and 3, a multi-core cable 1 includes a heat detection line (i.e., a linear heat detector, a heat detection wire) 2, a plurality of electric wires (i.e., power lines for supplying a large electric current) 3, and a sheath 4 for covering the heat detection line 2 and the plurality of electric wires 3 together.

This multi-core cable 1 is used to provide an electric current in a non-contact manner (for contactless power supplies) and is housed in a groove 11 of a housing 10. In the present embodiment, the housing 10 has a pair of side walls 12 arranged in parallel and a bottom wall 13 perpendicular to the side walls 12 for connecting the ends of side walls 12. The housing 10 as a whole is formed in U-shape (i.e., one-side opened rectangular shape) in a cross-sectional view. In this cross-section, a groove 11 is a space having a rectangular shape in a cross-sectional view that is surrounded by the pair of side walls 12 and the bottom wall 13, and is opened on the opposite side of the bottom wall 13.

(Heat Detection Line 2)

The heat detection line 2 includes a twisted pair wire 22 composed of a pair of heat detecting wires 21 being twisted together, a binder tape 23 wrapped spirally around the twisted pair wire 22, a jacket 24 covering around the binder tape 23, and a reinforcing layer 25 covering around the jacket 24.

Each of the pair of heat detecting wires 21 constituting the twisted pair wire 22 includes a first conductor 211, and a first insulator 212 for covering the periphery of the first conductor 211. As for the first conductor 211, it is preferable to use a conductor which can increase a force that allows the first conductors 211 to move closer to each other toward a center of the twisted pair wire 22 when the first conductors 211 are twisted together as the twisted pair wire 22.

As mentioned above, the multi-core cable 1 is used for contactless power supplies and is routed over long distances, for example 30 m or more, at factories. Therefore, the electrical conductivity of the first conductor 211 must be maintained high enough to detect a short circuit between the first conductors 211, 211, even over long distances. The first conductor 211 should be strong enough to ensure that wiring over long distances does not cause an open circuit (i.e., wire break). For the heat detection line 2 in the present embodiment, an outer diameter of the first conductor 211 is preferably 0.5 mm or more and 1.0 mm or less. By setting the outer diameter of the first conductor 211 to 0.5 mm or more, the conductor resistance is suppressed and the electrical conductivity is maintained high, allowing detection of the short circuit between the first conductors 211, 211 even over long distances. Also, by setting the outer diameter of the first conductor 211 to 0.5 mm or more, it is possible to suppress the deterioration in force of the first conductors 211, 211 to move closer to each other and the reduction in detection sensitivity, thereby improving the detection sensitivity of the temperature in the cable. On the other hand, by setting the outer diameter of the first conductor 211 to 1.0 mm or less, it is possible to suppress the hardening (induration) of the multi-core cable 1 and the difficulty of bending it, thus making it possible to achieve the multi-core cable 1 which is easy to route.

Further, in the heat detection line 2 in the present embodiment, the first conductor 211 is non-magnetic and made of copper alloy having a tensile strength of 900 MPa or more. More specifically, the first conductor 211 is made of phosphor bronze including tin (Sn) of 7 mass % or more and 9 mass % or less, and phosphor (P) of 0.03 mass % or more and 0.35 mass % or less.

By using a non-magnetic material as the first conductor 211, it is possible to suppress the loss in contactless power supplies and to reduce the efficiency of the contactless power supplies, in comparison with a magnetic material such as steel wire.

In addition, by setting the tensile strength of the first conductor 211 to 900 MPa or more (preferably 930 MPa or more, more preferably 990 MPa or more), it is possible to increase the force of the first conductors 211, 211 to move closer to each other toward the center of the twisted pair wire 22 in the state where the first conductors 211, 211 of the twisted pair wire 22 are twisted together. The first conductors 211, 211 are forced to move closer to each other toward the center of the twisted pair wire 22 by the tension generated by twisting the first conductors 211, 211. At this time, if the tensile strength of the first conductor 211 is less than 900 MPa, even though the first insulator 212 softens and melts, the first insulators 212, 212 between the first conductors 211, 211 may remain on surfaces of the first conductors 211, 211. Meanwhile, if the tensile strength of the first conductor 211 is 900 MPa or more, the first conductor 211 may function like a spring and the first conductors 211, 211 will contact each other in a short period of time. As a result, as soon as the first insulators 212, 212 soften and melt, the first conductors 211, 211 move toward the center of the twisted pair wire 22 and contact each other. This contact enables the detection sensitivity of the temperature in the cable to be improved.

In addition, it is preferable that the elongation of the first conductor 211 of the twisted pair wire 22 is 10% or less (more preferably, 3% or less) from the viewpoint of increasing the force that the two first conductors 211, 211 move closer to each other toward the center of the twisted pair wire 22 to improve the sensitivity of detection.

In the present embodiment, a single wire made of a phosphor bronze having a diameter of 0.9 mm, a tensile strength of 998.9 MPa, and an elongation of 2.4% is used as the first conductor 211. In addition, by setting the tensile strength of the first conductor 211 to 900 MPa or more, it is possible to ensure an enough strength that wiring over long distances will not cause the open circuit (wire break). The tensile strength and elongation of the first conductor 211 are measured by the tensile test method (test piece No. 9B) in accordance with JISZ2241 (2011).

The copper alloy for the first conductor 211 is not limited to phosphor bronze, and e.g., brass (Cu—Zn alloy), beryllium copper (BeCu), or the like may be used. However, it is more preferable to use phosphor bronze, which can increase the force allowing the first conductors 211, 211 of the twisted pair wire 22 to move closer to each other toward the center of twisted pair wire 22, and which is less expensive and less likely to cause the break of the wire.

As the first insulator 212, a relatively low melting point insulating resin is used to melt when the temperature in the cable rises. More specifically, the first insulator 212 is configured to melt before the second insulator 32 of the electric wire 3 (to be described below) melts due to the heat generated when the temperature in the cable rises due to overcurrent, etc., (i.e., in such a manner that the overcurrent generated by the first conductor 211 can be detected before the function of the electric wire 3 is lost due to the heat generated at the time of the temperature rise as described above). The melting point of the first insulator 212 is lower than the melting point of the second insulator 32 of the electric wire 3 (e.g., 105° C. or more). In the present embodiment, the goal was to operate at 100° C. for a few minutes (within 5 minutes) without operating at 80° C. or less, and the melting point of the first insulator 212 is set to be higher than 80° C. and less than 100° C. (more preferably, around 90° C.). Here, the first insulator 212 consisting of ionomer resin with a melting point of about 89° C. is used.

A thickness of the first insulator 212 is 0.1 mm or more and 0.3 mm or less. By setting the thickness of the first insulator 212 to 0.1 mm or more, it is possible to ensure the mechanical strength of the first insulator 212 and suppress unintentional damage to the first insulator 212, thereby suppress malfunction of the heat detection line 2. Also, by setting the thickness of the first insulator 212 to 0.3 mm or less, it is possible to quickly make contact between the first conductors 211, 211 when the first insulator 212 softens or melts, which suppresses the failure of contact between the first conductors 211, 211 even though the temperature in the cable is increasing. In the present embodiment, the thickness of the first insulator 212 is set to 0.15 mm and an outer diameter of the twisted pair wire 22 composed of two heat detecting wires 21 twisted together is 1.2 mm. In the first insulator 212, a thickness of a contacting portion which contacts each of the pair of heat detecting wires 21 constituting the twisted pair wire 22 (a contacting portion between the first insulators 212 of the pair of heat detecting wires 21 constituting the twisted pair wire 22) is preferably smaller than a thickness of a non-contacting portion which does not contact each of the pair of heat detecting wires 21 constituting the twisted pair wire 22 (a non-contacting portion between the first insulators 212 of the pair of heat detecting wires 21 constituting the twisted pair wire 22). This allows the first conductors 211, 211 to contact each other as soon as the first insulator 212 softens or melts, and helps to suppress the problem of the failure in contact between the first conductors 211, 211, even though the temperature in the cable has increased. In this case, the contacting portions where respective ones of the pair of heat detecting wires 21 constituting the twisted pair wire 22 preferably come into contact with each other to have a surface contact (face-contact). Here, the thickness is a minimum distance (minimum thickness) between an inner surface of the first insulator 212 and an outer surface of the first insulator 212.

Figure 4A:
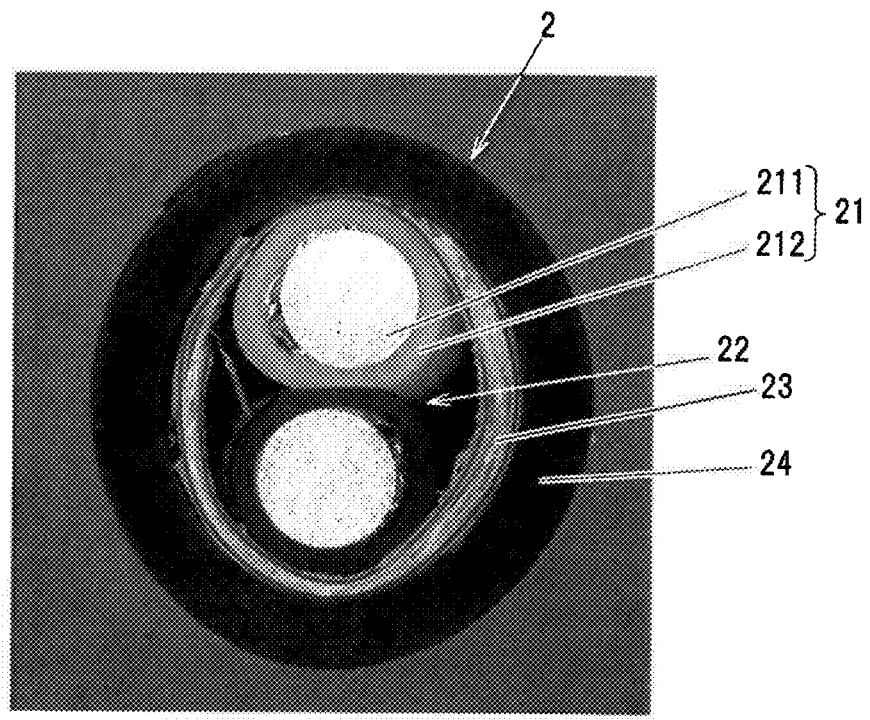
FIGS. 4A and 4B are pre-operation and post-operation photographic images for explaining an operation of a heat detection line.
Figure 4B:
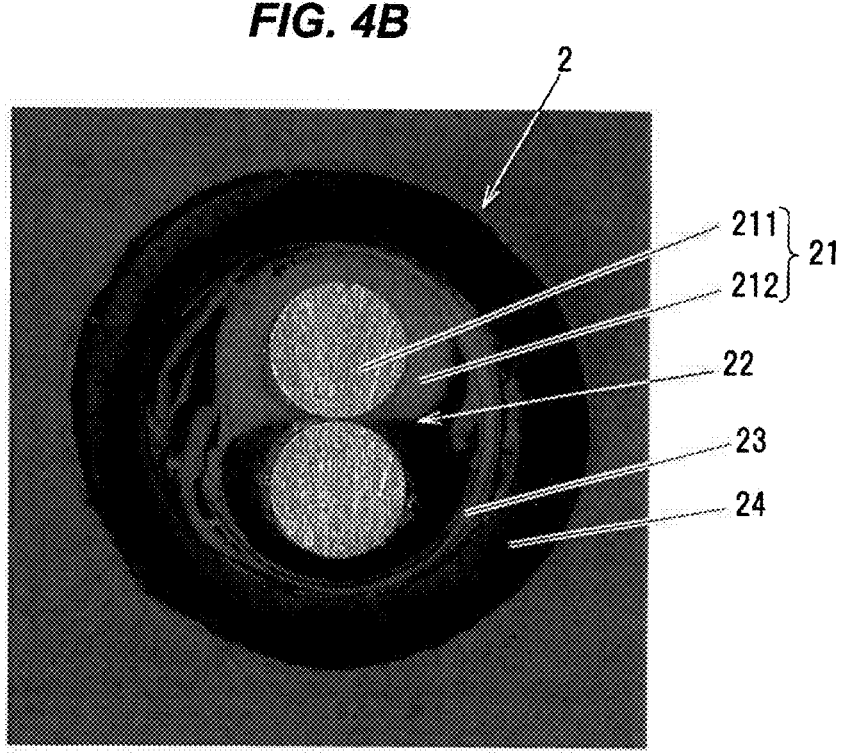

FIGS. 4A and 4B are pre-operation and post-operation photographic images for explaining an operation of the heat detection line 2. As shown in FIGS. 4A and 4B, in the heat detection line 2, the temperature in the cable (the temperature around the electric wire 3) rises equal to or above the melting point of the first insulator 212 (89° C. in this case) and below the melting point of the second insulator 32, and this heat causes the first insulator 212 to soften and melt. Then, the force of the twisted first conductors 211, 211 to move closer to each other toward the center of the twisted pair wire 22 moves the first conductors 211, 211 toward the center of the twisted pair wire 22 to contact each other, resulting in an electrical short circuit. In this case, the first insulator 212 is fused, and the force between the first conductors 211, 211 to move closer to each other pushes out the first insulators 212, 212 which exist between the first conductors 211, 211 from the vicinity of the center of the twisted pair wire 22. Therefore, the outline of the first insulator 212 is not circular, and the contacting portion where one first insulator 212 contacts the other first insulator 212 is slightly flattened. By detecting a short circuit between the two first conductors 211, 211, it is possible to detect an increase in temperature in the multi-core cable 1 due to overcurrent or the like. In the photographic images in FIGS. 4A and 4B, epoxy resin is packed around the heat detection line 2 to make it easier to identify the state of a cut end surface of the heat detection line 2. After polishing the cut end surface, the photographic images of the cut end surface were taken. Further, in FIGS. 4A and 4B, the reinforcing layer 25 is omitted.

By the way, in this heat detection line 2, the temperature around the heat detection line 2 increases, so that the first insulator 212 softens to close the distance between the two first conductors 211, 211, and the resistance value and the capacitance between the two first conductors 211, 211 change, before the two first conductors 211, 211 are short-circuited. Therefore, by measuring the resistance and/or the capacitance between the two first conductors 211, 211, it is possible to detect that the temperature around the heat detection line 2 is increasing before the two first conductors 211, 211 are short-circuited.

Moreover, although not shown, the first insulator 212 may have a multi-layered structure including plural layers of insulating resin composition. For example, by using the first insulator 212 with a two-layer structure and setting a melting point of an inner layer to be higher than a melting point of an outer layer, it is possible to detect the temperature rise in the multi-core cable 1 gradually (i.e., in stages).

In addition, if the first insulator 212 is multilayered, at least one layer other than the one closest to the first conductor 211 may include a particulate matter with a higher melting point than a melting point of the insulating resin used for the first insulator 212. The inclusion of a particulate matter with a high melting point in the first insulator 212 suppresses that the particulate matter is pushed in by the force of the first conductors 211, 211 to move closer to each other and left thinly on the first insulator 212, when the temperature around the heat detection line 2 increases. As a result, it is possible to generate a short circuit between the first conductors 211, 211. Electrically conductive materials are preferred as the particulate matter, because the insulating property of the particulate matter may cause the particulate matter to be trapped between the first conductors 211, 211, thereby preventing short circuits. For example, carbon particles can be used as the particulate matter.

A twist pitch of the twisted pair wire 22 is preferably approximately 20 times (18 times or more and 22 times or less) the outer diameter of the heat detecting wire 21. According to this configuration, it will be possible to maintain the force of the first conductors 211, 211 to move closer to each other, while it will be possible to suppress the break of the first insulator 212 by the force. It should be noted that the twist pitch of the twisted pair wire 22 is an interval between longitudinal positions of an arbitrary heat detecting wire 21 in a longitudinal direction of the twisted pair wire 22. An outer diameter of the heat detecting wire 21 is, e.g., 1.0 mm or more and 1.6 mm or less.

For the binder tape 23 to be wrapped around the twisted pair wire 22, a resin tape such as polyester tape may be used, for example. The binder tape 23 is wrapped spirally around the twisted pair wire 22 in such a manner that side edges in its width direction will partially overlap.

The jacket 24 serves as a protective layer to protect the twisted pair wire 22. It is preferable that a melting point of the jacket 24 is higher than the melting point of the first insulator 212, so that the jacket 24 does not melt before the first insulator 212 is melted. The jacket 24 is made of insulating resin and is formed by non-solid extrusion molding (so-called tube extrusion molding).

In the present embodiment, the jacket 24 is made of an elastic body. In the present embodiment, the heat detection line 2 is located in the center of the multi-core cable 1. When the multi-core cable 1 is housed in the groove 11, the multi-core cable 1 is accommodated in the groove 11 by pressing the multi-core cable 1 into the groove 11 of the housing 10. Then, when the multi-core cable 1 is pressed, the electric wires 3 in the multi-core cable 1 is pressed against the heat detection line 2 located in the center of the multi-core cable 1. At this time, the jacket 24 of the heat detection line 2 is elastically deformed by the force generated by the electric wires 3 being pressed, and the electric wires 3 in the sheath 4 are able to move (i.e., elastic) in a circumference direction or a radial direction (i.e., a direction along a periphery of the heat detection line 2 and along the outer diameter of the heat detection line 2 in the cross-section perpendicular to the cable longitudinal direction of the multi-core cable 1) of the heat detection line 2). Therefore, the outline of the multi-core cable 1 can be deformed according to the shape and dimensions of the groove 11. This makes it easier for the multi-core cable 1 to fit into the groove 11 of the housing 10 even if the outer diameter of the multi-core cable 1 is increased.

In this way, the jacket 24 of the heat detection line 2 has an elastic deformability to improve the workability of the multi-core cable 1 in the groove 11. The jacket 24 also reinstates the shape by reducing the force applied from the electric wires 3 after the multi-core cable 1 is placed in the groove 11. The resilience of the jacket 24 at this time causes the electric wires 3 in the sheath 4 to move to their original positions (before the multi-core cable 1 is housed in the groove 11). This means that the multi-core cable 1 housed in the groove 11 is restored to its original outline and held in the groove 11. In this way, the jacket 24 of the heat detection line 2 also holds the multi-core cable 1 in the groove 11 by pushing the sheath 4 to the housing 10 (an inner wall of the groove 11) through the electric wires 3.

As the jacket 24, it is preferable to use an elastic material whose shape changes by an external force. For example, it is possible to use a resin composition comprising PVC (polyvinyl chloride) resin (heat-resistant vinyl resin), or urethane resin, or the like. In the present embodiment, an outer diameter of the jacket 24 (i.e., the outer diameter of the heat detection line 2) is set to 3.1 mm.

The jacket 24 is composed of a single layer as shown in FIG. 1B, or multiple layers as shown in FIG. 1C.

Referring to FIG. 1C, for example, the jacket 24 includes an inner layer 241 and an outer layer 242. The inner layer 241 is configured in such a manner that its inner surface is in contact with the twisted pair wire 22. The outer layer 242 is configured in such a manner that its inner surface is in contact with the inner layer 241. The outer layer 242 will come into contact with the electric wire 3 when the heat detection line 2 is placed inside the multi-core cable 1. In other words, an outer periphery surface of the outer layer 242 is the outer periphery surface of the jacket 24. It is preferable that a thickness of the inner layer 241 is smaller than a thickness of the outer layer 242. The thickness of the inner layer 241 is, e.g., 0.2 mm or more and 0.4 mm or less. The thickness of the outer layer 242 is, e.g., 0.2 mm or more and 0.4 mm or less. In these thickness ranges, it is preferable to set the thickness of the outer layer 242 to be greater than the thickness of the inner layer 241. In this case, the overall thickness of the jacket 24 is preferably 0.4 mm or more and 0.8 mm or less. In the multi-core cable 1, the jacket 24 of the heat detection line 2 is configured with a layered structure consisting of the inner layer 241 and the outer layer 242 as described above, which makes it easier to adjust the overall thickness of the jacket 24 to a thickness where the electric wires 3 placed around the heat detection line 2 are less likely to drop in the center of the multi-core cable 1. If the electric wires 3 are less likely to drop in the center of the multi-core cable 1, it is possible to place the electric wires 3 in balanced (almost equally spaced) positions around the heat detection line 2. This helps to improve the accuracy in heat detection by the heat detection line 2 and to improve the efficiency in the contactless power supplies of the electric wires 3.

In addition, the outer layer may have different characteristics, such as hardness and melting point, from those of the inner layer. For example, both the inner and outer layers have different hardness, even if they are made of resin compositions mainly of polyvinyl chloride resin. In this case, the hardness of the outer layer is preferably higher than that of the inner layer. This allows the outer layer to be easily removed (stripped off) from the inner layer. Also, the hardness of the outer layer is preferably higher than the hardness of the second insulator 32 constituting the electric wire 3. This makes it difficult to drop the electric wires 3 into the center of the multi-core cable 1, and makes it possible to uniformize the cross-sectional shapes of the electric wires 3 (the cross-sectional shape of the second conductor 31) to be described later.

The reinforcing layer 25 makes the cross-sectional shape perpendicular to the cable longitudinal direction of the heat detection line 2 a substantially circular shape, and it also makes it difficult to deform the above cross-sectional shape of the heat detection line 2 when the heat detection line 2 is placed in the center of the multi-core cable 1. Having such a reinforcing layer 25 can suppress the electric wires 3 from falling into the center of the multi-core cable 1. This allows the electric wires 3 placed around the heat detection line 2 to be placed approximately equally spaced in the circumferential direction of the multi-core cable 1, and distances from the heat detection line 2 to respective centers of the electric wires 3 to be approximately the same. Further, in the present embodiment, the electric wires 3 are pressed against the heat detection line 2 so that each electric wire 3 has a non-circular cross section. However, by providing the reinforcing layer 25, the cross-sectional shapes of the electric wires 3 can be uniformized (to be described later).

As the reinforcing layer 25, for example, a tape layer composed of a plastic tape being spirally wound around the outer periphery of the jacket 24, and an extruded resin layer composed of insulating resin extruded by tube extrusion, or the like may be used. If the reinforcing layer 25 is used as the tape layer, it may be multi-layered. For example, a multi-layered tape layer may include an inner tape layer composed of a plastic tape being spirally wound around the outer periphery of the jacket 24, and an outer tape layer composed of a plastic tape being spirally wound around an outer periphery of the inner tape layer. It is preferable that winding directions of respective plastic tapes that constitute the inner and outer layers are different from each other. This makes it easier to achieve the function of the reinforcing layer 25 described above. The reinforcing layer 25 is preferably harder than the second insulator 32 constituting the electric wire 3. As the plastic tape or insulating resin to be use for the reinforcing layer 25, e.g., polyethylene, fluoropolymer, or the like can be used. In the present embodiment, a resin tape composed of polyethylene is used for the inner tape layer and the outer tape layer, and the reinforcing layer 25 is formed by winding doubly the resin tape composed of polyethylene.

The electric wires 3 are in direct contact with an outer surface of the reinforcing layer 25, namely an outer surface of the heat detection line 2. Further, in the present embodiment, at least one of the electric wires 3 is brought into surface contact with the outer surface of the heat detection line 2. The electric wire 3 is pressed against and closely contact with the heat detection line 2, and a portion (a radially inward portion) of the outer surface of the electric wire 3 is deformed in an arc shape along the outer surface of the heat detection line 2. According to this configuration, the heat detection line 2 closely contacts with the electric wires 3 so that the heat transfers from the electric wires 3 to the heat detection line 2 easily, which makes it possible to immediately detect the temperature rise of the electric wires 3 by the heat detection line 2. Further, since the electric wires 3 are pressed against the heat detection line 2, the first conductors 211, 211 will easily contact to each other when the temperature in the multi-core cable 1 rises, which makes it possible to improve the detection sensitivity.

In FIG. 1A, all the electric wires 3 are brought into surface contact with the outer surface of the heat detection line 2 in the cross-section perpendicular to the cable longitudinal direction. However, the present invention is not limited thereto. For example, as shown in the photographic image of FIG. 2, it is enough that at least one of the electric wires 3 is brought into surface contact with the outer surface of the heat detection line 2. However, from the perspective of locating the electric wires 3 around the heat detection line 2 with good balance (at substantially even intervals) and detecting the temperature rise of the electric wires 3 immediately, it is more preferable that the outer surface of the heat detection line 2 is brought into direct contact with the electric wires 3 as much as possible (most preferably, all the electric wires 3).

(Electric Wire 3)

Each of the electric wires 3 includes a second conductor 31 composed of a stranded wire conductor formed by collectively twisting multiple strands, and a second insulator 32 covering the second conductor 31. Six electric wires 3 are of the same structure. In the present embodiment, as the strand (elementary wire) for the second conductor 31, a tin (Sn)-plated soft copper wire is used. An outer diameter of the strand used for the second conductor 31 is preferably 0.15 mm or more and 0.32 mm or less. If the outer diameter of the strand is less than 0.15 mm, it is likely that the wire breaks will occur. Meanwhile, if the outer diameter of the strand is more than 0.32 mm, the strand may protrude through the second insulator 32 when the second insulator 32 is thin.

As a method of twisting the strands, so-called "concentric twisting" method of twisting plural strands around a strand has been known. If this method is used to form the second conductor 31, the strands will be twisted together in a stable state, and the shape of the second conductor 31 will be less deformed by the external force for housing the multi-core cable 1 into the groove 11. Therefore, the second conductor 31 should be formed by so-called "collective twisting" method of twisting strands all together so that the external force for housing the multi-core cable 1 into the groove 11 can easily change the shape of the second conductor 31. In the present embodiment, one hundred thirty-four (134) strands each having the outer diameter of 0.26 mm are twisted collectively to form the second conductor 31 having an outer diameter of approximately 3.5 mm (3.0 mm or more and 4.0 mm or less) and a conductor cross-sectional area of 7 mm$^2$ or more and 8 mm$^2$ or less.

In order to increase the cross-sectional area of the conductor part in the multi-core cable 1, it is preferable that the second insulator 32 of each electric wire 3 is as thin as possible. More specifically, the thickness of the second insulator 32 should be half (½) or more and 1 time or less the outer diameter of the strand used for the second conductor 31. If the thickness of the second insulator 32 is less than ½ of the outer diameter of the strand, the external force of housing the multi-core cable 1 into the groove 11 may cause the strand to break through the second insulator 32. If the thickness of the second insulator 32 exceeds 1 time the outer diameter of the strand, the electric wire 3 will be large in diameter, which leads to the increase in diameter of the entire multi-core cable 1. In the present embodiment, the thickness of the second insulator 32 is approximately 0.2 mm (approximately 0.77 times of the outer diameter of the strand). It is preferable that the second insulator 32 of each electric wire 3 is composed of the same material and a single layer, in order to minimize the thickness. Further, in order to enable contactless power supplies with a larger current, it is preferable that the same power current is supplied to the respective second conductors 31 of the electric wires 3.

The second insulator 32 can be formed by thin wall molding method. As the second insulator 32, it is preferable to use a material that is harder than the jacket 24 and more resistant to an external pressure (which is less likely to deform due to the external force for housing the multi-core cable 1 into the groove 11), so as to facilitate the elastic deformation of the jacket 24 of the heat detection line 2. For example, fluoropolymers such as ETFE (tetrafluoroethylene-ethylene copolymer), FEP (tetrafluoroethylene-hexafluoropropylene copolymer), PTFE (polytetrafluoroethylene), PVDF (polyvinylidene difluoride), polyimide, PEEK (polyetherether ketone) can be used for the second insulator 32. More preferably, fluorine resins having a good surface slidability may be used as the second insulator 32. This makes it easier for the electric wires 3 to move within the sheath 4 and makes it easier to insert the multi-core cable 1 into the groove 11, when the external force is applied.

The second insulator 32 is formed by non-solid extrusion molding (so-called tube extrusion molding). As a result, the second insulator 32 does not securely and closely contact the strands. This makes it possible for the strands to move each other within the second insulator 32, thereby making it easier to deform the cross-sectional shape of the electric wire 3 when the external force is applied. Therefore, it is easier to insert the multi-core cable 1 into the groove 11.

In the multi-core cable 1 according to the present embodiment, the second conductor 31 is formed in such a manner that the shape of the second conductor 31 in the cross-section perpendicular to the cable longitudinal direction is non-circular. More specifically, the second conductor 31 is formed in a substantially fan shape where a width along a circumferential direction is gradually increased from a radially inward portion to a radially outward portion. This makes it possible to increase a cross-sectional area of the second conductor 31 as much as possible in a limited space within the sheath 4. Further, the current flowing in the second conductor 31 passes through an outward portion (an outer periphery region, i.e., a portion around an outer periphery portion 3c to be described later) in the cable radial direction of the second conductor 31. By providing the second conductor 31 with a cross-sectional shape where the width along the circumferential direction is gradually increased from the radially inward portion to the radially outward portion, the size (the cross-sectional area and the surface area) of the second conductor 31 is increased in the outer periphery region to which the electric current is concentrated. According to this configuration, in the multi-core cable 1, it is possible to suppress the current loss in the second conductor 31, thereby contribute to the improvement in efficiency of the contactless power supplies.

The cross-sectional shape of the electric wire 3 as a whole, including the second conductor 31, is non-circular by being pressed by sheath 4 to be described later. More specifically, a part of the outer surface of the electric wire 3 is a heat detection line-contacting portion 3a which is brought into surface contact with the outer surface of the heat detection line 2. The heat detection line-contacting portion 3a has a substantially arc shape along the outer surface of the heat detection line 2. Further, in the multi-core cable 1, the electric wires 3 adjacent to each other in the circumferential direction are brought into surface contact each other. The portion brought into surface contact is a substantially flat electric wire-contacting portion 3b. The electric wire-contacting portion 3b has a flat surface substantially along the cable radial direction in the cross-section perpendicular to the cable longitudinal direction. Further, a part of the outer surface of the electric wire 3 is the outer periphery portion 3c formed in a shape along the inner surface of the sheath 4 in the cross-section perpendicular to the cable longitudinal direction. In the present embodiment, the outer periphery portion 3c directly contacts the inner surface of the sheath 4 and the outer periphery portion 3c has a substantially arc-shaped surface along the inner surface of the sheath 4. However, the outer periphery portion 3c is not required to directly contact the sheath 4. For example, the outer periphery portion 3c may contact the inner surface of the sheath 4 via a binder tape which is spirally wound around the electric wires 3.

It is desired that the outline (cross-sectional shape) of the heat detection line 2 is closest as possible to a circular shape in such a manner that all the electric wires 3 deforms uniformly when being pressed by the sheath 4. If the outline of the heat detection line 2 located at the center of the multi-core cable 1 (i.e., cable center) is for example oval or uneven, the variation in outline among the electric wires 3 located around the heat detection line 2 will be increased depending on the outline of the heat detection line 2, so that the current loss (difficulty in flowing the current) varies among the respective electric wires 3. If the current loss varies among the respective electric wires 3, the efficiency of the contactless power supplies may be deteriorated. In the present embodiment, so as to make the outline of the heat detection line 2 located at the cable center closer to a circular shape, two resin tapes composed of polyethylene are wound around the jacket 24 in opposite winding directions, to provide the reinforcing layer 25 having a double-layer structure. By providing the reinforcing layer 25 having a relatively high hardness (for example, to be harder than the jacket 24) as an outermost layer of the heat detection line 2, the outline of the heat detection line 2 can be kept in a shape closest as possible to a circular shape, so that the cross-sectional shapes of the electric wires 3 can be uniformized (the variation in outline among the electric wires 3 can be reduced). In other words, the outline of the heat detection line 2 located at the cable center is preferably formed into a shape which can provides substantially uniform pressing forces between the heat detection line 2 and the respective electric wires 3 arranged around the heat detection line 2. In the state where the electric wires 3 are arranged around the heat detection line 2 located at the cable center and the sheath 4 is provided around the electric wires 3, the heat detection line 2 is pressed by the electric wires 3, so that the outline of the heat detection line 2 is, in actual cases, non-circular due to the pressing forces between the heat detection line 2 and the respective electric wires 3 arranged around the heat detection line 2. In the present embodiment, the heat detection line 2 is pressed by six electric wires 3, so that the outline of the heat detection line 2 is substantially hexagonal (see FIG. 2).

(Assembly 6)

On the outer periphery of the heat detection line 2, the electric wires 3 are twisted spirally. Hereinafter, an aggregate comprising the electric wires 3 twisted around the heat detection line 2 is referred to as an assembly 6.

If the number of the electric wires 3 used for the assembly 6 is from one to three, the multi-core cable 1 will hardly be deformed by the external force. For this reason, the number of the electric wires 3 used for the assembly 6 is four or more in the multi-core cable 1. In the present embodiment, the number of the electric wires 3 used for the assembly 6 is six, with which the narrowest outer diameter and the lowest sum of the conductor resistance of all the electric wires 3 can be provided. In the assembly 6, the electric wires 3 adjacent to each other in the cable circumferential direction are brought into surface contact with each other at the electric wire-contacting portions 3b. Further, the electric wire 3 is brought into surface contact with the heat detection line 2 at the heat detection line-contacting portion 3a.

It is preferable that a twisting direction of the assembly 6 is opposite to a twisting direction of the twisted pair wire 22 in the heat detection line 2. By reversing the twisting direction of the assembly 6 and the twisting direction of the twisted pair wire 22, the twist of the electric wires 3 is less likely to loosen, and it is possible to keep the heat detection line 2 being tightened by the electric wires 3. As a result, when the temperature in the multi-core cable 1 increases, the tightening of the electric wires 3 makes it easier for the first conductors 211 to come into contact with each other, thereby increasing the sensitivity in detection. The twisting direction of the assembly 6 is the direction in which the electric wires 3 are rotated from one end to the other end of the assembly 6 when viewing the assembly 6 from the one end. The twisting direction of the twisted pair wire 22 is the direction in which the heat detecting wires 21 are rotated from one end to the other end of the twisted pair wire 22 when viewed from the one end of the twisted pair wire 22.

In the present embodiment, each electric wire 3 constituting the assembly 6 is configured to come into surface contact the inner periphery surface of the sheath 4 at the outer periphery portion 3c. No binder tape is wrapped around the assembly 6. This is because if a tape is wrapped around the assembly 6, the tape will function to restrict the movement of the electric wire 3, which may reduce the workability of inserting the multi-core cable 1 into the groove 11. If it is necessary to keep the electric wires 3 being twisted together for manufacturing reasons, it may be necessary to wrap threads (such as resin threads or cotton threads) spirally around the assembly 6.

A fibrous filler may be provided between the heat detection line 2 and the electric wires 3, and between the electric wires 3 and the sheath 4. It is preferable to use a filler with high heat resistance (at least the heat-resistant temperature is 100° C. or higher) in order to suppress the possibility of the burning of the filler due to the temperature rise in the multi-core cable 1. By providing the filler, the overall outline of the multi-core cable 1 can be closer to a circular shape, thereby improving the usability. In the present embodiment, no fibrous filler is provided between the heat detection line 2 and the electric wires 3, and between the electric wires 3 and the sheath 4. This is to suppress the possibility of burning of the filler due to elevated temperature, and to ensure a space (i.e., an air layer 5) where the electric wire 3 can move in the circumferential direction and in the radial direction (radially outwardly) of the heat detection line 2, when the external force is applied to the multi-core cable 1.

(Sheath 4)

The sheath 4 is provided around the assembly 6. In the present embodiment, the sheath 4 is formed by non-solid extrusion molding (so-called tube extrusion molding). The sheath 4 is formed as a hollow cylinder with a hollow section 41 along the longitudinal direction. Within this hollow section 41, the heat detection line 2 and the electric wires 3 (i.e., the assembly 6) are placed. This allows each electric wire 3 to move with each other within the sheath 4 in the multi-core cable 1.

In the present embodiment, the binder tape is omitted, and each electric wire 3 is configured to directly contact with the inner periphery surface of the sheath 4. In the present embodiment, the sheath 4 functions to push the electric wires 3 radially inwardly and to press the electric wires 3 against the heat detection line 2. A contact area between the electric wire 3 and the sheath 4 (an area of the outer periphery portion 3c) is greater than a contact area between the electric wire 3 and the heat detection line 2 (an area of the heat detection line-contacting portion 3a).

A thickness of the sheath 4 is preferably 0.6 mm or more and 1.0 mm or less. If the thickness of the sheath 4 is less than 0.6 mm, the damage resistance, insulation performance and the like will be deteriorated. Meanwhile, if the thickness of the sheath 4 exceeds 1.0 mm, it will lead to the increase in diameter of the multi-core cable 1.

In addition, by forming the sheath 4 by non-solid extrusion molding (tube extrusion molding) and reducing the thickness of the sheath 4 to 1.0 mm or less, the outer surface of the sheath 4 can be made uneven (e.g., with undulation) in such a manner that the sheath 4 includes convex portions corresponding to the electric wires 3. This makes it easier to press the multi-core cable 1 into the groove 11 of the housing 10 when inserting the multi-core cable 1 into the groove 11 of the housing 10. This also reduces the contact area between the multi-core cable 1 and the housing 10 (the inner surface of the groove 11), and makes it easier to insert the multi-core cable 1 into the groove 11. In the present embodiment, as the sheath 4, a sheath made of polyvinyl chloride with a thickness of 0.8 mm is used.

(Evaluation Test of the Heat Detection Line 2)

In Example, a sample (prototype) of the heat detection line 2 using a single wire, which has a diameter of 0.9 mm, a tensile strength of 998.9 MPa, and an elongation of 2.4%, and is composed of phosphor bronze (7 mass % or more and 9 mass % or less of Sn, 0.03 mass % or more and 0.35 mass % or less of P, the balance of Cu and a trace of inevitable impurities) as the first conductor 211 was prepared. Then, the operation of the heat detection line 2 in Example was evaluated. During the evaluation, the length of the heat detection line 2 was set to 80 m, 100 m, and 400 m. Each heat detection line 2 was introduced into a thermostat chamber, and the time until the occurrence of a short circuit between the first conductors 211, 211 was measured. The temperature inside the thermostat chamber was set at 80° C., 100° C., 120° C., and 140° C., and test was conducted for each temperature. Table 1 shows the measurement results of the heat detection line 2 in Example.

TABLE 1

| | | Thermostat chamber temperature [° C.] | | | |
|---|---|---|---|---|---|
| | | 80 | 100 | 120 | 140 |
| Cable length [m] | 80 | No operation for 2 hours | 3 min 07 sec | 54 sec | 42 sec |
| | 100 | | 2 min 44 sec | 55 sec | 43 sec |
| | 400 | | 2 min 17 sec | 1 min 00 sec | 42 sec |

As shown in Table 1, the heat detection line 2 in Example was not operating at 80° C. for 2 hours at any length, and was operating at 100° C. for a few minutes (nearly three minutes). Therefore, good operation of the heat detection line 2 was confirmed.

(Functions and Effects of the Embodiment)

As explained above, the multi-core cable 1 in the present embodiment incorporates the heat detection line 2, the second conductor 31 has a cross-sectional shape in the direction perpendicular to the cable longitudinal direction in which the width along the circumferential direction is gradually increased from the radially inward portion to the radially outward portion.

By incorporating the heat detection line 2, it is possible to accurately detect the temperature rise in the multi-core cable 1 installed in the housing 10. Further, by setting the cross-section of the second conductor 31 in the direction perpendicular to the longitudinal direction to have a shape in which the width along the circumferential direction is gradually increased from the radially inward portion to the radially outward portion, it is possible to securely provide a large cross-sectional area of the second conductor 31 in a limited space within the sheath 4, and to increase the cross-sectional area or the like of the second conductor 31 located at the outer periphery region into which the electric current is concentrated. Thus, it is possible to suppress the deterioration in efficiency of the contactless power supplies.

SUMMARY OF THE EMBODIMENTS

Next, the technical ideas grasped from the aforementioned embodiments will be described with the aid of the reference characters and the like in the embodiments. It should be noted, however, that each of the reference characters and the like in the following descriptions is not to be construed as limiting the constituent elements in the appended claims to the members and the like specifically shown in the embodiments.

[1] A multi-core cable (1), comprises:

a heat detection line (2) comprising a twisted pair wire (22) comprising a pair of heat detecting wires (21) being twisted together, each heat detecting wire (21) comprising a first conductor (211) and a first insulator (212) covering a periphery of the first conductor (211); a plurality of electric wires (3) spirally twisted around the heat detection line (2), each electric wire (3) comprising a second conductor (31) and a second insulator (32) covering a periphery of the second conductor (31); and a sheath (4) covering the heat detection line (2) and the plurality of electric wires (3) together, wherein a melting point of the first insulator (212) is lower than a melting point of the second insulator (32), wherein the second conductor (31) has a shape in a cross-section perpendicular to a cable longitudinal direction in which a width along a circumferential direction is gradually increased from a radially inward portion to a radially outward portion.

[2] In the multi-core cable (1) as described in [1], at least one of the plurality of electric wires (3) is brought into surface contact with an outer surface of the heat detection line (2).

[3] In the multi-core cable (1) as described in [1] or [2], the electric wires (3) adjacent to each other in a circumferential direction are brought into surface contact with each other.

[4] In the multi-core cable (1) as described in any one of [1] to [3], a part of an outer surface of the second insulator (32) in the plurality of electric wires (3) is formed in a shape along an inner surface of the sheath (4) in a cross-sectional view perpendicular to the cable longitudinal direction.

[5] In the multi-core cable (1) as described in any one of [1] to [4], the heat detection line (2) further comprises a jacket (24) covering a periphery of the twisted pair wire (22), and a reinforcing layer (25) covering a periphery of the jacket (24), and the reinforcing layer (25) is a tape layer comprising a resin tape being wound spirally around the jacket.

[6] In multi-core cable (1) as described in any one of [1] to [5], a periphery of the twisted pair wire (22) is covered by a jacket (24), the jacket (24) includes an inner layer (241) and an outer layer (242), and a thickness of the outer layer (242) is greater than a thickness of the inner layer (241).

[7] In the multi-core cable (1) as described in any one of [1] to [6], the first conductor (211) is non-magnetic and comprises a copper alloy with a tensile strength of 900 MPa or more.

[8] In the multi-core cable (1) as described in any one of [1] to [7], when the first insulators (212) are softened or melted at a given temperature, the first conductors (211) of the pair of heat detecting wires (22) move toward a center of the twisted pair wire (22) and contact each other, by a force which allows the first conductors (211) to move closer to each other.

[9] In the multi-core cable (1) as described in [8], a melting point of the first insulator (212) is greater than 80° C. and less than 100° C., short circuit does not occur in an environment of 80° C., while the short circuit occurs within 5 minutes in an environment of 100° C. The short circuit may occur within approximately 3 minutes in the environment of 100° C.

[10] In the multi-core cable (1) as described in any one of [1] to [9], the first conductor (211) comprises phosphor bronze including 7 mass % or more and 9 mass % or less of Sn, and 0.03 mass % or more and 0.35 mass % or less of P.

Although the embodiments of the present invention have been described above, the aforementioned embodiments are not to be construed as limiting the inventions according to the appended claims. Further, it should be noted that not all the combinations of the features described in the embodiments are indispensable to the means for solving the problem of the invention. Further, the present invention can appropriately be modified and implemented without departing from the spirit of the present invention.

What is claimed is:

1. A multi-core cable, comprising:
   a heat detection line comprising a twisted pair wire comprising a pair of heat detecting wires being twisted together, each heat detecting wire comprising a first conductor and a first insulator covering a periphery of the first conductor;
   a plurality of electric wires spirally twisted around the heat detection line, each electric wire comprising a second conductor and a second insulator covering a periphery of the second conductor, wherein a thickness of the second insulator is half (½) or more and 1 time or less an outer diameter of each strand constituting the second conductor; and
   a sheath covering the heat detection line and the plurality of electric wires together,
   wherein a melting point of the first insulator is lower than a melting point of the second insulator,
   wherein the second conductor has a shape in a cross-section perpendicular to a cable longitudinal direction in which a width along a circumferential direction is gradually increased from a radially inward portion to a radially outward portion.

2. The multi-core cable, according to claim 1, wherein at least one of the plurality of electric wires is brought into surface contact with an outer surface of the heat detection line.

3. The multi-core cable, according to claim 2, wherein the heat detection line further includes a jacket including a plurality of layers of insulating resin around the twisted pair wire and a reinforcing layer covering around the jacket.

4. The multi-core cable, according to claim 3, wherein outer surfaces of the electric wires are in contact with an outer surface of the reinforcing layer.

5. The multi-core cable, according to claim 1, wherein the electric wires adjacent to each other in a circumferential direction are brought into surface contact with each other.

6. The multi-core cable, according to claim 1, wherein a part of an outer surface of the second insulator in the plurality of electric wires is formed in a shape along an inner surface of the sheath in a cross-sectional view perpendicular to the cable longitudinal direction.

7. The multi-core cable, according to claim 1, wherein the heat detection line further comprises a jacket covering a periphery of the twisted pair wire, and a reinforcing layer covering a periphery of the jacket, and
   wherein the reinforcing layer comprises a tape layer comprising a resin tape being wound spirally around the jacket.

8. The multi-core cable, according to claim 1, wherein a periphery of the twisted pair wire is covered by a jacket,
   wherein the jacket includes an inner layer and an outer layer, and
   wherein a thickness of the outer layer is greater than a thickness of the inner layer.

9. The multi-core cable, according to claim 1, wherein the first conductor is non-magnetic and comprises a copper alloy with a tensile strength of 900 MPa or more.

10. The multi-core cable, according to claim 1, wherein when the first insulators are softened or melted at a given temperature, the first conductors of the pair of heat detecting wires move toward a center of the twisted pair wire and contact each other, by a force which allows the first conductors to move closer to each other.

11. The multi-core cable, according to claim 10, wherein a melting point of the first insulator is greater than 80° C. and less than 100° C.,
   wherein short circuit does not occur in an environment of 80° C., while the short circuit occurs within 5 minutes in an environment of 100° C.

12. The multi-core cable, according to claim 1, wherein the first conductor comprises phosphor bronze including 7 mass % or more and 9 mass % or less of Sn, and 0.03 mass % or more and 0.35 mass % or less of P.

13. The multi-core cable, according to claim 1, wherein the heat detection line further includes a jacket including a plurality of layers of insulating resin around the twisted pair wire and a reinforcing layer covering around the jacket.

14. The multi-core cable, according to claim 13, wherein outer surfaces of the electric wires are in contact with an outer surface of the reinforcing layer.

15. The multi-core cable, according to claim 1, wherein the heat detection line includes a binder tape wrapped spirally around the twisted pair wire, a jacket covering around the binder tape, and a reinforcing layer covering around the jacket.

16. The multi-core cable, according to claim 15, wherein the electric wires are in direct contact with an outer surface of the reinforcing layer, and
   wherein at least one of the electric wires is brought into surface contact with an outer surface of the heat detection line, such that the electric wire is pressed against and closely contacts with the heat detection line, and a radially inward portion of an outer surface of the electric wire is deformed in an arc shape along the outer surface of the heat detection line.

17. The multi-core cable, according to claim 1, wherein the heat detection line closely contacts with the electric wires so that the heat transfers from the electric wires to the heat detection line, and
  wherein the electric wires are pressed against the heat detection line and the first conductors contact to each other when a temperature in the multi-core cable rises.

18. The multi-core cable, according to claim 1, wherein the second insulator is composed of a same material and a single layer,
  wherein an outer diameter of the first conductor is 0.5 mm or more and 1.0 mm or less, and
  wherein a thickness of the first insulator is 0.1 mm or more and 0.3 mm or less.

19. The multi-core cable, according to claim 1, wherein the shape of the second conductor in the cross-section perpendicular to the cable longitudinal direction is non-circular and such that the second conductor is formed in a substantially fan shape.

20. A multi-core cable, comprising:
  a heat detection line comprising a twisted pair wire comprising a pair of heat detecting wires being twisted together, each heat detecting wire comprising a first conductor and a first insulator covering a periphery of the first conductor, wherein the heat detection line further includes a jacket including a plurality of layers of insulating resin around the twisted pair wire and a reinforcing layer covering around the jacket;
  a plurality of electric wires spirally twisted around the heat detection line, each electric wire comprising a second conductor and a second insulator covering a periphery of the second conductor, wherein a thickness of the second insulator is half (½) or more and 1 time or less an outer diameter of each strand constituting the second conductor; and
  a sheath covering the heat detection line and the plurality of electric wires together,
  wherein a melting point of the first insulator is lower than a melting point of the second insulator,
  wherein the second conductor has a shape in a cross-section perpendicular to a cable longitudinal direction in which a width along a circumferential direction is gradually increased from a radially inward portion to a radially outward portion, and
  wherein outer surfaces of the electric wires are in contact with an outer surface of the reinforcing layer.

* * * * *